Jan. 6, 1942. R. A. GOEPFRICH 2,269,262
BRAKE
Filed April 27, 1940 2 Sheets-Sheet 1

INVENTOR.
RUDOLPH A. GOEPFRICH
BY
ATTORNEY.

Jan. 6, 1942.  R. A. GOEPFRICH  2,269,262
BRAKE
Filed April 27, 1940  2 Sheets-Sheet 2
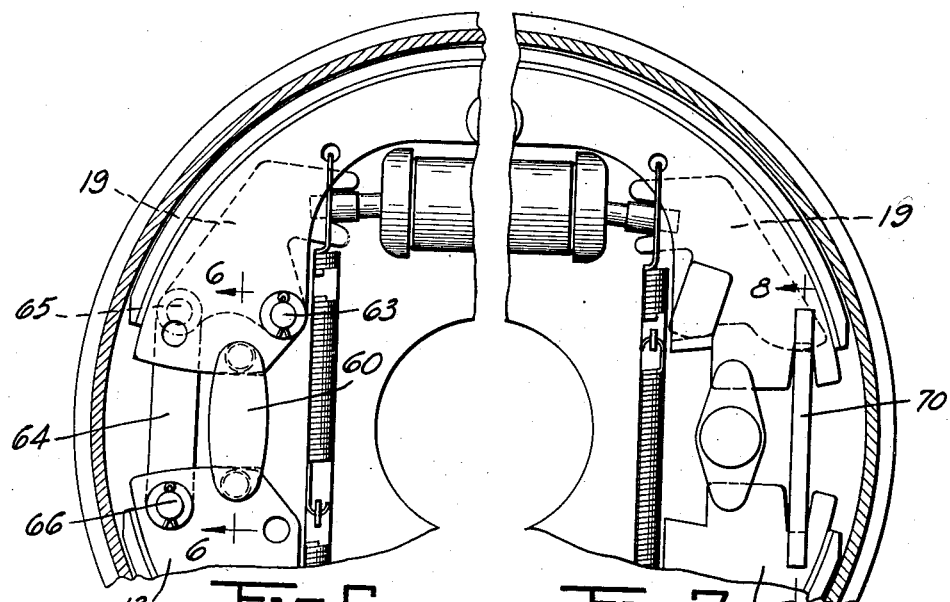
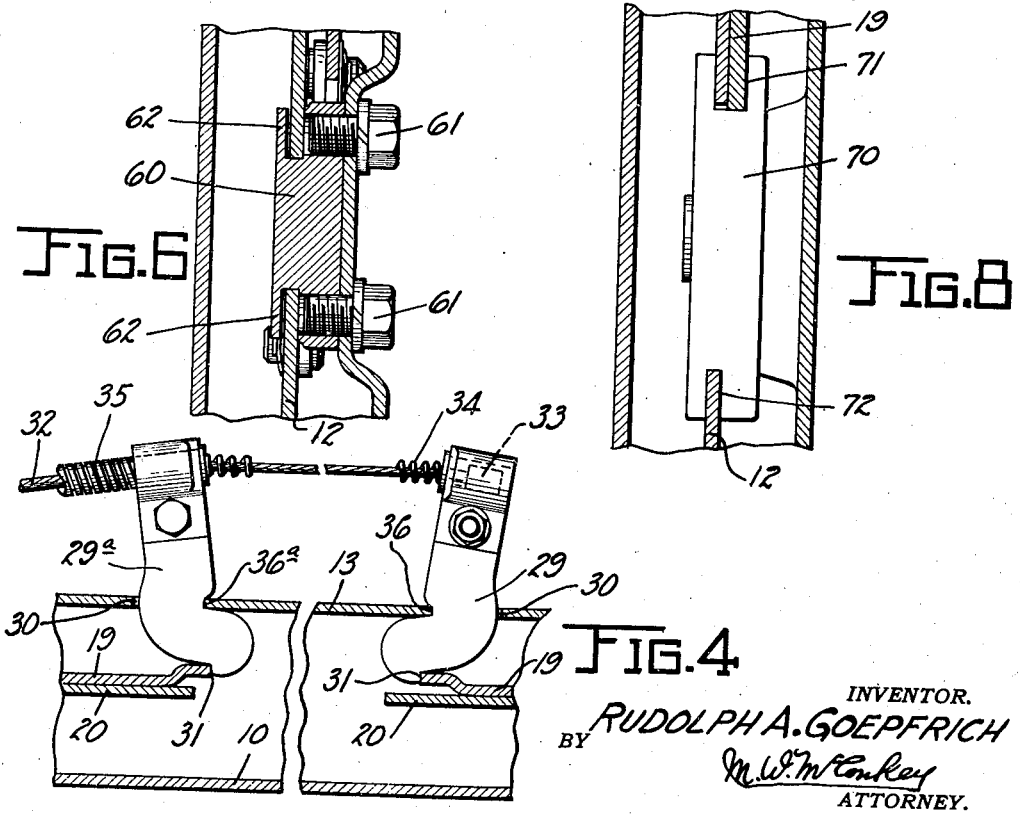
INVENTOR.
RUDOLPH A. GOEPFRICH
BY M. W. McConkey
ATTORNEY.

Patented Jan. 6, 1942

2,269,262

UNITED STATES PATENT OFFICE 2,269,262

BRAKE

Rudolph A. Goepfrich, South Bend, Ind., assignor to Bendix Aviation Corporation, South Bend, Ind., a corporation of Delaware Application April 27, 1940, Serial No. 331,955

8 Claims. (Cl. 188—152)

This invention relates to brakes, and is illustrated as embodied in an internal expanding brake for an automobile wheel.

An object of the invention is to simplify a brake of a very effective type, by arranging a single hydraulic wheel-cylinder device to apply through mechanical connections balanced thrusts on the ends of two shoes which individually anchor at opposite ends during forward and reverse braking. Various features of novelty relate to the structure and arrangement of the mechanical devices through which the hydraulic device acts on the two shoes, to the return spring arrangement of a brake of this character, and to the use of the brake as an emergency brake applied through auxiliary connections.

The above and other objects and features of the invention will be apparent from the following description of the illustrative embodiments shown in the accompanying drawings, in which:

Figure 1 is a section through the brake, just inside the head of the brake drum, showing the brake shoes in side elevation;

Figures 2 and 3 are partial sections on the lines 2—2 and 3—3 of Figure 1;

Figure 4 is taken on the line 4—4 of Figure 1 and shows the brake applying parts of the mechanical or emergency brake;

Figure 5 shows a modification of the thrust-applying means of Figure 1;

Figure 6 is a partial section on the line 6—6 of Figure 5;

Figure 7 is a further modification of the thrust-applying means of Figures 1 and 5; and Figure 8 is a section taken on the line 8—8 of Figure 7.

Figure 1:
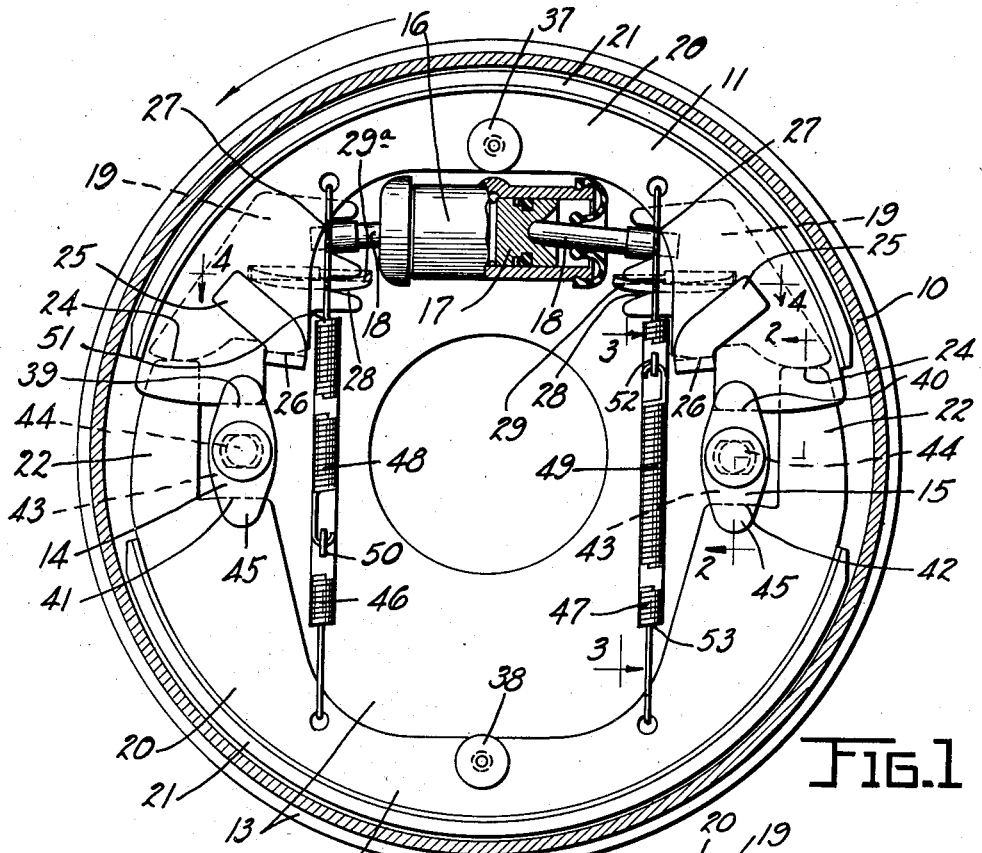

The brake assembly shown as illustrative of my invention comprises generally a rotatable brake drum 10 and brake shoes 11 and 12 adapted to at times frictionally engage the brake drum. The brake shoes are shown positioned horizontally, i. e., so positioned that a line drawn from one end to the other of either of the shoes would be substantially horizontal.

A stationary backing plate 13 is provided for receiving the braking torque and, for this purpose, has fixed thereto a pair of anchors 14 and 15. A hydraulic wheel cylinder 16, of the conventional type, is secured to the backing plate 13 and is preferably arranged generally centrally opposite the upper shoe 11.

The structure of my improved brake is symmetrical, and it will therefore be convenient to appropriate a single identifying number to each of two similar parts of the brake assembly. The hydraulic cylinder 16 is provided with a pair of fluid-actuable pistons 17, each of which is contacted at its outer, or brake-applying surface, by a thrust link 18. Each of the thrust links 18 is connected at its other (or outer) end to a floating lever 19. The said levers 19 are, as will hereinafter be explained, the means for spreading the ends of the shoes to apply them to the drum when the wheel cylinder 16 is actuated.

Figures 2, 3:
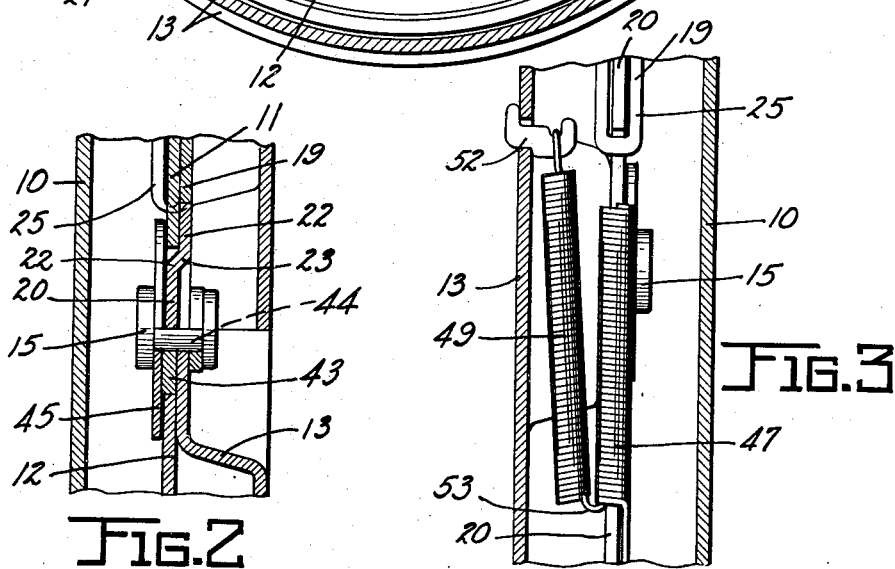

The shoes 11 and 12 each include a web portion 20 and a lining or friction portion 21. It will be noted that the web of the shoe 12 is provided at each end with an extension 22 which projects upward beyond the adjacent anchor, and beyond the adjacent lower end of the web of the shoe 11. As shown more clearly in Figure 2, the web of the shoe 12 is beveled at 23 to clear the web of the shoe 11 and meet the lower end of the lever 19 at 24.

The levers 19, as well as the upper ends of the extensions 22 are positioned behind the web of the shoe 11, as indicated by the dotted lines of Figure 1. The levers 19 have integral therewith arms 25 which are folded over the respective ends of the web of shoe 11 to embrace the said web. The inside surfaces of the bends or folds formed by the arms 25 with their respective levers meet projections on the web of the shoe 11, engaging the said projections at 26. It will be seen, therefore, that the levers 19 contact at 24 the respective ends of the shoe 12 and contact at 26 the respective ends of the shoe 11.

A notch 27 is cut in each of the thrust-transmitting levers 19 to receive end of the corresponding thrust link 18. Each of the levers also has a notch 28 below notch 27 for receiving one end of a connecting element 29 or 29a which is part of the mechanical or emergency brake applying linkage. The two elements 29 and 29a bear at the points 31 on the respective levers 19 and extend through openings 30 in the backing plate. On the side of the backing plate away from the shoes and brake drum the elements 29 and 29a are connected to a cable 32. Sliding movement of 29a along the cable is permitted, while 29 is prevented from slipping off the end of the cable by engagement with the enlarged end 33 of the cable. A spring 34, in compression between the elements 29 and 29a, serves to normally hold apart the ends of the said elements which are connected to the cable 32. A conduit 35 encases the cable 32 and bears at its end against the element 29a. Movement of the cable leftward relative to the conduit causes the conduit, pressing against the element 29a, to compress the spring and tend to draw the ends of the elements 29 and 29a together. Each of the said elements then operates as a lever fulcruming on the backing plate, 29 fulcruming at 36 and 29—a at 36a. This combined lever action of the elements 29 and 29—a acts to spread the thrust transmitting levers 19.

The brake shoes 11 and 12 are, as stated above, individually shiftable to anchor at either end, depending upon direction of movement of the wheel when the brakes are applied. Steady rests 37 and 38 are provided for restricting movement of the shoes along the axis of the drum. The shoe 11 contacts the anchor 14 at 39 and the anchor 15 at 40. The shoe 12 contacts the anchor 14 at 41 and the anchor 15 at 42. The shoes thus anchor against the ends of oblong anchor members 43 which are secured to the backing plate by bolts 44 (see Figure 2). Thin plates 45, held in position by the bolts 44, help to hold the shoe webs against lateral movement. A pair of relatively heavy return springs 46 and 47 are tensioned between the shoes 11 and 12 at opposite sides of the brake. A second pair of relatively light springs 48 and 49 are provided to create a differential between the forces exerted at the opposite ends of the return springs 46 and 47. The spring 48 is hooked at 50 to the backing plate and at 51 to the uppermost coil of spring 46. Spring 49 (see Figure 3) is hooked at 52 to the backing plate and at 53 to the lowermost coil of the spring 47.

It is believed the mode of operation of my improved brake will be obvious from the above description. Force exerted by the pressure fluid in the hydraulic cylinder 16, or alternately by manipulation of the mechanical linkage will spread the uper ends of the levers 19. The lever shown at the right of the brake will swing in a clockwise direction exerting at 24 a downward force to push shoe 12 into the drum and exerting at 26 an upward and outward force to push shoe 11 against the drum. At the same time the lever at the left of the brake will exert similar applying forces on the opposite ends of the shoes. If the direction of drum rotation is forward (the direction indicated by the arrow), shoe 11 will anchor at 39 and shoe 12 will anchor at 42. If the direction of drum rotation is reversed, shoe 11 will anchor at 40 and shoe 12 will anchor at 41. In either case a balanced shoe spreading force is exerted between each pair of adjacent shoe ends by the levers 19. The anchored end of one shoe serves as a fulcrum about which the associated lever 19 moves to apply the unanchored end of the other shoe. The light springs 48 and 49 serve to improve or speed up braking during forward rotation of the drum.

Since the spring 48 is hooked to the backing plate and to the upper coil of spring 46, the force of spring 48 will tend to hold the left end of the shoe 11 away from the drum until the left end of the shoe 12 has been moved against the drum. This is true because the force of the spring 48 tends to hold the shoe 11 against its anchor at 39 but has no effect on the movement of the shoe 12. Consequently the lever 19 will tend to pivot on shoe 11 and to apply shoe 12. The same effect is secured at the other side of the brake by the springs 47 and 49, except that in this case spring 49 tends to hold the right end of the shoe 12 against its anchor. Thus the right end of the shoe 11 is allowed to move against the drum before the right end of the shoe 12.

It therefore appears that, when the drum is rotating in a forward direction, brake applying movement will tend to move the toe or unanchored portions of the respective shoes against the drum before the heel or anchored portions of the shoes are so moved. Braking when the vehicle is moving forward is therefore speeded up and made more effective. Any accompanying loss in the speed or effectiveness of braking during rearward motion is not, under ordinary driving conditions, as important as the advantage gained for braking during forward motion.

The modification shown in Figures 5 and 6 is substantially the same as the brake already described. However, the anchors each comprise a solid block 60, which is held to the backing plate by a pair of bolts 61. Flanges 62 on the anchor serve to hold the webs of the shoes against lateral movement. Each of the levers 19 is pivotally secured to one end of the web of shoe 11 by means of a pin 63. A thrust link 64 is fixed at 65 to the lower end of each lever 19 and at 66 to the opposite upper end of the shoe 12. Therefore, thrust applied by the hydraulic cylinder to the levers 19 swings the levers about the point 63 to exert a thrust through the links 64 on the respective ends of the shoe 12. At the same time the resistance of the ends of shoe 12 against brake applying movement tends to cause the levers 19 to fulcrum about the point 65 and to thus carry the respective ends of the shoe 11 toward the brake drum.

The modification of Figures 7 and 8 is similar to the brake shown in Figure 1 except that the lower end of the lever 19 does not contact the end of the shoe 12, but instead contacts the upper end of a thrust link 70. As shown in Figure 8 the thrust link 70 is notched at 71 to receive the lower end of the lever 19 and is notched at 72 to receive the upper end of the shoe 12. The operation of this modification is in all respects similar to the brake of Figure 1 except of course that the thrust downward on the shoe 12 is applied through the link 70. In either of the modifications of my improved brake, the two brake shoes are so designed as to be interchangeable. In this respect the modifications may have some commercial advantage over the brake of Figure 1.

It will be understood that in the modifications shown the brake is in each case symmetrically arranged in the manner of the brake of Figure 1.

While I have shown several embodiments of my invention, it is intended that the showing and description be merely illustrative. It is therefore my intention not to limit my invention otherwise than by the terms of the appended claims.

I claim:

1. A brake comprising a pair of shoes arranged to anchor individually at opposite ends in forward and reverse braking, a wheel-cylinder hydraulic applying device, and two balanced-thrust mechanical devices operated by the hydraulic applying device and each of which acts with balanced thrusts on the ends of the shoes at one side of the brake, the hydraulic device being fixedly mounted and the mechanical devices each comprising a lever having its body portion on one side of the web of one of the shoes and having a portion folded over the web to hold the said lever in alignment with the shoe and to provide a pivot for the lever on the shoe web.

2. A brake comprising a pair of shoes arranged to anchor individually at opposite ends in forward and reverse braking, a wheel-cylinder hydraulic applying device having a pair of pistons, and two balanced-thrust mechanical devices operated by the hydraulic applying device and each of which acts with balanced thrusts on the ends of the shoes at one side of the brake, each mechanical device consisting of a lever pivotally mounted on one shoe and linked to the other shoe and a link connected to the lever and contacting one of the pistons.

3. A brake comprising a pair of shoes arranged to anchor individually at opposite ends in forward and reverse braking, a pair of oppositely disposed anchors, a wheel-cylinder hydraulic applying device, and two balanced-thrust mechanical devices operated by the hydraulic applying device and each of which acts with balanced thrusts on the ends of the shoes at one side of the brake, each mechanical device consisting of a lever pivotally mounted on one shoe and having thrust engagement with the end of the other shoe, both the pivot point of the lever and the thrust engagement point of the lever being on the same side of a center line extending through the brake from anchor to anchor.

4. A brake comprising a pair of shoes arranged to anchor individually at opposite ends in forward and reverse braking, a wheel-cylinder hydraulic applying device, and two balanced-thrust mechanical devices operated by the hydraulic applying device and each of which acts with balanced thrusts on the ends of the shoes at one side of the brake, together with a mechanical emergency applying device acting on the ends of the shoes at one side of the brake independently of the hydraulic device.

5. A brake comprising a pair of shoes arranged to anchor individually at opposite ends in forward and reverse braking, a wheel-cylinder hydraulic applying device, and two balanced-thrust mechanical devices operated by the hydraulic applying device and each of which acts with balanced thrusts on the ends of the shoes at one side of the brake, together with a mechanical emergency applying device acting on the balanced-thrust mechanical devices independently of the hydraulic device.

6. A brake comprising a pair of shoes arranged to anchor individually at opposite ends in forward and reverse braking, a wheel-cylinder hydraulic applying device, and two balanced-thrust mechanical devices operated by the hydraulic applying device and each of which acts with balanced thrusts on the ends of the shoes at one side of the brake, each mechanical device comprising a lever adapted to contact one shoe at one point and the other shoe at another point, all of the said contact points of both levers against both shoes being on the same side of the center of the brake.

7. A brake comprising a pair of shoes arranged to anchor individually at opposite ends in forward and reverse braking—one of said shoes having projections at each end extending toward the other shoe, a wheel cylinder hydraulic applying device, and two balanced thrust mechanical devices operated by the hydraulic applying device, each of the mechanical devices consisting of levers having a part engaging the aforesaid projections on one of the shoes and a part folded over the web of the other of the shoes.

8. A brake comprising a pair of shoes arranged to anchor individually at opposite ends in forward and reverse braking—one of said shoes having projections at each end extending toward the other shoe, a wheel cylinder hydraulic applying device, mechanical linkage operating independently of the hydraulic device, and two balanced thrust mechanical devices operable by the hydraulic applying device or the mechanical linkage, each of the mechanical devices consisting of levers having a part engaging the aforesaid projections on one of the shoes and a part folded over the web of the other of the shoes.

RUDOLPH A. GOEPFRICH.